United States Patent
Lee et al.

(10) Patent No.: US 7,010,230 B2
(45) Date of Patent: Mar. 7, 2006

(54) INTEGRATED HIGH-SPEED MULTIPLE-RATE OPTICAL-TIME-DIVISION-MULTIPLEXING MODULE

(75) Inventors: Ku-Suen Lee, Hong Kong (CN); Jinghui Li, San Jose, CA (US); Tongqing Wang, Los Altos, CA (US); Dennis Lam, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 757 days.

(21) Appl. No.: 10/024,303

(22) Filed: Dec. 21, 2001

(65) Prior Publication Data

US 2004/0208414 A1 Oct. 21, 2004

(51) Int. Cl.
*H04J 14/08* (2006.01)

(52) U.S. Cl. .................................. 398/102; 398/53

(58) Field of Classification Search .............. 398/98, 398/99, 100, 101, 102, 103, 53, 197
See application file for complete search history.

(56) References Cited

U.S. PATENT DOCUMENTS

| 6,091,864 | A | * | 7/2000 | Hofmeister ................... 385/2 |
| 6,690,891 | B1 | * | 2/2004 | Le Sauze et al. ........... 398/154 |
| 2002/0048067 | A1 | * | 4/2002 | Handelman et al. ........ 359/139 |

OTHER PUBLICATIONS

Horikawa, K., et al. "Photonic Switched True Time Delay Beam Forming Network Integrated on Silica Waveguide Circuits," 1995 IEEE MTT-S International Microwave Symposium Digest, May 1995, vol. 1, pp 65-68.*

Johnson, J., et al. "Fully Stabilized Electroabsorption-Modulated Tunable DBR Laser Transmitter for Long-Haul Optical Communications," IEEE Journal of Selected Topics in Quantum Electronics, Mar./Apr. 2001, vol. 1, No. 2, pp. 168-177.*

* cited by examiner

*Primary Examiner*—Christina Y. Leung
(74) *Attorney, Agent, or Firm*—Fish & Richardson P.C.

(57) ABSTRACT

A novel integrated multiple-rate optical time division multiplexing (OTDM) module is disclosed. An integrated set of modulators generates optical RZ signal streams which are then time-delayed by a set of integrated optical delay switching and combining arrays and interleaved to produce an OTDM signal. The integrated optical delay switching and combining arrays are adapted to be controllably set to various delays to facilitate interleaving of many possible bit-rates. Such an approach alleviates stability problems offered by conventional fiber-based OTDM technology, increases flexibility, aids in reducing the size, complexity, and cost. Furthermore, the OTDM chip of the present invention offers fine tuning capabilities thereby allowing for slight adjustments in the interleaving of optical signal streams if needed. The present invention also provides for the integration of an optical pulse source chip and a multiple-rate OTDM chip onto a single substrate or platform using hybrid packaging technology.

18 Claims, 6 Drawing Sheets

INTEGRATED HIGH-SPEED MULTIPLE-RATE OPTICAL-TIME-DIVISION-MULTIPLEXING MODULE

FIELD OF THE INVENTION

This invention relates to optical time division multiplexing (OTDM) and more particularly to a multiple-rate optical time division multiplexing module integrated onto an optical chip, and a multiple-rate OTDM module integrated onto a single substrate having an optical pulse source (OPS).

BACKGROUND OF THE INVENTION

In general, there are two common data formats for the transmission of high-speed digital data. Non-Return-to-Zero (NRZ) signal format is the more popular of the two formats due to its inherent simplicity. In this particular format, each "0" or "1" data bit is represented by a low or high signal level, Respectively, lasting an entire clock period. However, with ever-increasing data rates, especially in optical transmission systems, Return-to-Zero (RZ) signal formats are becoming the transmission format of choice. In RZ modulation format, each data bit occupies only a portion of tile clock period creating a distinct transition between adjacent bits and, thereby, producing a cleaner optical signal for the receiver to read. For high-rate (>10 Gbit/s) or ultra-long-haul (>1000 km) transmission, the RZ modulation technique is now coming into vogue as it affords certain efficiency gains such as higher signal-to-noise ratio (SNR) and lower crosstalk amongst adjacent bits. In this way, bit-error-rate (BER) may be improved. RZ encoding also offers better immunity to fiber nonlinear effects and the effects of polarization mode dispersion (PMD), factors which can limit long-haul or high-rate transmission severely. Optical transmission based on OTDM technology uses the RZ format primarily because of the relative ease it affords for multiplexing in the optical time domain.

The explosive growth of the Internet, and the corresponding demand for bandwidth has necessitated the introduction of optical time division multiplexing (OTDM) technology. The bandwidth of electrical components currently used for multiplexing and routing is rapidly being pushed to its fundamental physical limit. With the tremendous growth in data traffic predicted over the next few years, OTDM technology will be needed to avoid the potential electronic bottleneck that these multiplexers and routers will impose upon the next generation Internet.

In today's optical backbone network, dense wavelength division multiplexing (DWDM) enables high capacity transmission by combining multiple optical carriers on a single fiber. Each carrier or wavelength is modulated with a data channel having a rate up to, for example, 10 Gbps. In this way, the electronic bottleneck may be alleviated by shifting the electrical multiplexing to the optical spectral domain. However, the operation and management of DWDM systems is highly complicated and costly. Accordingly, single wavelength systems with higher data rates e.g. 40 or 80 Gbits/s are resurfacing as an alternative to DWDM systems in order to maintain the same total capacity. Single wavelength channels with higher rates could be multiplexed together to form a higher capacity DWDM system. Therefore, a key issue is to achieve higher rates per single optical channel which cannot be achieved by electrical time division multiplexing (ETDM) technology. OTDM technology is used for achieving higher rate per single channel in the optical domain.

In optical transmission systems, the bit rate is rising continuously. Target values for the future are on the order of 40 to 80 Gbit/s. With known transmitter combinations of semiconductor lasers with external modulators, such target values are attainable only with great difficulty. However, signal streams generated by individual transmitters may be combined in an optical time division multiplexer to make a signal stream with a higher bit rate.

The fundamental premise of OTDM technology is to solve the bandwidth bottleneck problem that ETDM technology is not currently able to address. ETDM technology is based on a traditional scheme of multiplexing individual lower-rate electronic signals into a high-speed serial electronic signal, The high-speed serial electrical signal may then be converted to an optical signal using a directly modulated laser or external modulator. These methods have worked well for data transmission rates up to 40 Gbit/s. However, electrical components for ETDM technology such as electrical multiplexers and demultiplexers (EMUXs and EDMUXs), that can achieve the high data rates (e.g. work beyond 40 Gbit/s) required today, are not expected to be available for the next several years.

On the other hand, OTDM technology makes the implementation of 80 Gbit/s, 160 Gbt/s or even higher capacity systems more achievable as compared to their electrical counterparts. In this lies the biggest advantage of OTDM technology. OTDM also opens the door for higher-rate nonlinear optical transmission such as, for example, soliton transmission which may make it possible to achieve transmission rates as high as 160 Gbit/s for very long distances without regeneration.

OTDM technology is based on a purely optical method fox achieving very high data rate systems. For example, to generate an 80 Gbit/s RZ data stream, a 40 GHz clock pulse with, say, a pulsewidth of 6 picoseconds is first generated. Two sets of four 10 Gbit/s NRZ electrical signals may then be multiplexed via 4:1 EMUXs to form two 40 Gbit/s NRZ signal streams. The two 40 Gbit/s NAZ signal streams may then be applied to two corresponding external optical modulators to gate the incoming 40 GHz RZ clock pulses. In this way, the NRZ electrical signals are converted to RZ optical signals. One of the two 40 Gbit/s optical RZ signal streams may then be delayed by half a clock period to allow for interleaving in the time domain. The two 40 Gbit/s optical RZ signal streams may then be combined to form the final 80 Gbit/s optical RZ data stream.

The advantage of OTDM technology is that it alleviates the bandwidth bottleneck that ETDM technology is not able to currently address. Furthermore, the data received after transmission is of a better quality than that achieved through ETDM techniques. For example, generation of a 40 Gbit/s signal can easily be achieved through OTDM by applying two 20 Gbit/s NRZ electrical signal streams on an optical multiplexer (OMUX) e.g. combination of two amplitude modulators and then delaying one optical data stream 25 ps relative to the other. Interleaving these two signal streams will then produce a 40 Gbit/s signal.

However, there are downsides to OTDM technology as well Specifically, current OTDM implementations are relatively more complicated, expensive, and inflexible than their counterpart ETDM solutions. So even though it's easier to get to 40 Gbit/s systems using OTDM technology today (because 40 Gbit/s electronics have not been fully developed), these are not very easy systems to build and manage.

Even so, for data rates greater than 40 Gbit/s, OTDM technology is definitely the technology of choice in that it satisfies important transmission requirements e.g. minimal chromatic dispersion, reduced polarization mode dispersion and reduced impact of fiber non-linearities.

Today, 40 Gbit/s ETDM systems are, in fact, emerging. Compared to current OTDM implementations, ETDM is generally more compact and cost effective due to processing technology available for electronic chip integration. However, for higher rate (e.g. 80 Gbit/s) and long-haul transmission requiring minimal chromatic and polarization mode dispersion, the use of OTDM technology is more effective than ETDM.

Existing approaches for OTDM implementation are based on fiber optics and discreet electro-optic components. For example, the optical clock pulse described above may be divided amongst the two modulators via a fiber coupler and the delay required for interleaving may be realized by using fiber of an appropriate length, the delay required depending upon the expected bit-rate of the data stream to be multiplexed. The two RZ optical signal streams may then be combined, again using a fiber coupler. These kind of approaches are rather expensive and bulky and face stability and processing problems. Moreover, these approaches are inflexible in that they inherently employ a fixed delay for a single expected data rate. In situations where an expected data stream will vary in bit rate, or in which the OTDM is required to accommodate different signals with different bit-rates, current OTDM modules will not be capable of proper time domain multiplexing because the fixed optical delay utilized therein will not match that required for multiplexing data streams of the various bit rates. An example situation requiring a flexible bit rate to adapt to coding rate changes is when Forward Error Correction (FEC) code is required and added to a standard 40 Gbit/s SONET system data stream, bringing the total bit rate to 43 Gbit/s. Bit rate scalability is also desirable in advanced OTDM systems. For Example, when upgrading a 40 Gbit/s system to 80 Gbit/s, a multiple-rate. OTDM which could simply be switched to operate at the higher bit rate, would be desirable to avoid replacing all existing 40 Gbit/s OTDM modules with newly designed 80 Gbit/s OTDM modules. It would be desirable for there to be a solution which provides optical time division multiplexing for a number of different bit rates.

Optical pulse sources have traditionally been physically separate from OTDM modules. Solutions based on this approach are bulky, complicated and expensive and may also suffer from signal loss associated with chip-to-chip connections.

Currently, when utilizing optical pulse sources, fiber is needed to guide light to other devices or modules. Such an approach leads to many problems when connecting an optical pulse source to an OTDM module, such as difficulty in polarization matching, optical power loss, and optical reflection. Since an OTDM module is polarization sensitive, when connecting a pulse source to an OTDM module an additional polarization controlling device is required for matching the polarization states. If polarization matching is not provided, the efficiency of the OTDM module will be reduced. The fiber from an optical pulse source is a kind of optical waveguide. At a fiber-to-fiber connection between the waveguide from the pulse source and that of the OTDM module, a great optical power loss can be produced if the waveguide dimensions (e.g. fiber core dimensions), shapes, orientations, and physical positions are mismatched. The is also reflection at this connection point between the waveguide from the pulse source and that of the OTDM module which may affect the stability of other devices in the system including for example the laser source.

It would be desirable to integrate an optical pulse source and an OTDM onto a single substrate or platform using hybrid packaging technology to mitigate some of the problems of the traditional approach.

SUMMARY OF THE INVENTION

Optical time division multiplexing (OTDM) is a technique which takes advantage of the Return-to-Zero (RZ) transmission format to alleviate the electronic bandwidth bottleneck. In its simplest form, the OTDM technique attempts to insert one bit of data between two adjacent bits to produce a higher (e.g. double) data rate. Very extensive research has been performed within the field of optical time division multiplexing (OTDM) for generating ultra-high bit rate signals at and in excess of 40 Gbit/s. To generate OTDM signals, very nigh quality short pulse sources based on mode-locking lasers or external modulators are required, as well as high-precision optical multiplexers. The present invention proposes a novel optical time division multiplexing (OTDM) module capable of multiple-rate multiplexing. In the preferred embodiments, this multi-rate OTDM module is integrated on an optical chip. In so doing at least some of the problems related to optically multiplexing data streams of differing bit rates are mitigated by providing a single integrated multiple-rate OTDM module which can optically multiplex signals having different bit-rates. The present invention also provides for the integration of an optical pulse source chip and a multiple-rate OTDM chip onto a single substrate or platform using hybrid packaging technology. In so doing at least some of the problems mentioned above with respect to size, complexity, cost, and problems associated with optical connections of present solutions are mitigated.

According to a first broad aspect, the invention provides for an integrated multiple-rate optical time division multiplexing (OTDM) module having at least one integrated controllable optical delay switching and combining array for introducing at least one prescribed optical delay between a plurality of optical RZ signal streams to facilitate time division multiplexing of the plurality of optical RZ signal streams, in which the at least one integrated controllable optical delay switching and combining array is adapted to controllably introduce a selected one of a plurality of optical signal delays to at least one of the plurality of optical RZ signal streams, whereby the time division multiplexing of the plurality of optical RZ signal screams may be facilitated for a number of different data rates.

Advantageously, some embodiments the invention provide for the at least one integrated controllable optical delay switching and combining array having at least one optical switch and a plurality of optical delay elements.

Some embodiments of the invention provide for the at least one integrated controllable optical delay switching and combining array being arranged in a parallel configuration and further having an n:1 optical combiner, the at least one optical switch being a 1:n optical switch, and the plurality of optical delay elements having n optical delay elements.

Some embodiments of the invention provide for the at least one integrated controllable optical delay switching and combining array being arranged in a cascaded configuration and further having a 2:1 optical combiner, the at least one optical switch having one 1:2 optical switch and n−1 2:2 optical switches, and the plurality of optical delay elements having 2n optical delay elements.

Some embodiments of the invention provide for the at least one integrated controllable optical delay switching and combining array being arranged in a parallel configuration and further having a 2:1 optical combiner, the at least one optical switch being a 1:2 optical switch, and the plurality of optical delay elements having two optical delay elements coupled to two outputs of the 1:2 optical switch, the two optical delay elements being coupled to two inputs of the 2:1 combiner.

Advantageously the invention provides for the at least one integrated controllable optical delay switching and combining array having m−1 integrated controllable optical delay switching and combining arrays, the at least one prescribed optical delay having m−1 prescribed optical delays, and the plurality of optical RZ signal streams having m optical RZ signal streams.

Some embodiments of the invention provide for m being 2, the at least one integrated controllable optical delay switching and combining array being arranged in a parallel configuration and having a 1:n optical switch, n optical delay elements, and an n:1 optical combiner, and the plurality of optical delays having a set of n optical delays.

Some embodiments of the invention provide for m being 2, and the at least one integrated controllable optical delay switching and combining array being arranged in a cascaded configuration and having a 1:2 optical switch, n−1 2:2 optical switches, 2n optical delay elements, and a 2:1 optical combiner.

Some embodiments of the invention provide for m being 2, and the at least one integrated controllable optical delay switching and combining array having a 1:2 optical switch, two optical delay elements, and a 2:1 optical combiner.

Some embodiments of the invention provide for the m−1 prescribed optical delays having the set of prescribed optical delays Tj/m where j∈{1, . . . , m−1} and T is a period of the plurality of optical RZ signal streams.

Advantageously the invention provides for at least one electrode being deposited over a portion of a waveguide having at least one of the plurality of optical RZ signal streams travelling therein, in which a voltage applied to the at least one electrode is used for fine tuning an optical time delay introduced to the at least one of the plurality of optical RZ signal streams travelling in the portion of a waveguide.

Advantageously the invention provides for a waveguide power tap for each of the plurality of optical RZ data streams.

According to a second broad aspect, the invention provides for an integrated optical time division multiplexing (OTDM) subsystem having an optical pulse source (OPS) chip, a multiple-rate OTDM chip comprising at least one integrated controllable optical delay switching and combining array for introducing at least one prescribed optical delay between a plurality of optical RZ signal streams to facilitate time division multiplexing of the plurality of optical RZ signal streams, wherein the at least one integrated controllable optical delay switching and combining arrays is adapted to controllably introduce a selected one of a plurality of optical signal delays to at least one of the plurality of optical RZ signal streams, whereby the time division multiplexing of the plurality of optical RZ signal streams may be facilitated for a number of different data rates, and optical connections (OC)s in which the OPS chip and the multiple-rate OTDM chip are integrated in a single substrate using hybrid packaging technology.

Advantageously the invention provides for the OPS chip having a photodiode, a laser source, an electro-absorption modulator (EAM), and a semiconductor optical amplifier (SOA), in which the photodiode monitors the optical power of the laser source, and the laser source produces an optical signal for gating by the EAM producing an optical pulse signal, the optical pulse signal amplified by the SOA to produce an amplified optical pulse signal, the amplified optical pulse signal provided to the multiple-rate OTDM chip for use in multiplexing a plurality of data signals.

Some embodiments of the invention provide for the EAM and the laser source being integrated in the same semiconductor chip.

Some embodiments of the invention provide for the EAM and the SOA being integrated in the same semiconductor chip.

Some embodiments of the invention provide for the EAM, the SOA, and the laser source being integrated in the same semiconductor chip.

According to a third broad aspect, the invention provides for a multiple-rate optical time division multiplexing (OTDM) module having at least one controllable optical delay switching and combining array for introducing at least one prescribed optical delay between a plurality of optical RZ signal streams to facilitate time division multiplexing of the plurality of optical RZ signal streams, in which the at least one controllable optical delay switching and combining array is adapted to controllably introduce a selected one of a plurality of optical signal delays to at least one of the plurality of optical RZ signal streams, whereby the time division multiplexing of the plurality of optical RZ signal streams may be facilitated for a number of different data rates.

Other aspects and features of the present invention will become apparent to those ordinarily skilled in the art upon review of the following description of specific embodiments of the invention in conjunction with the accompanying drawings.

DETAILED DESCRIPTION OF THE PREFERRED EMBODIMENTS

Figure 1:
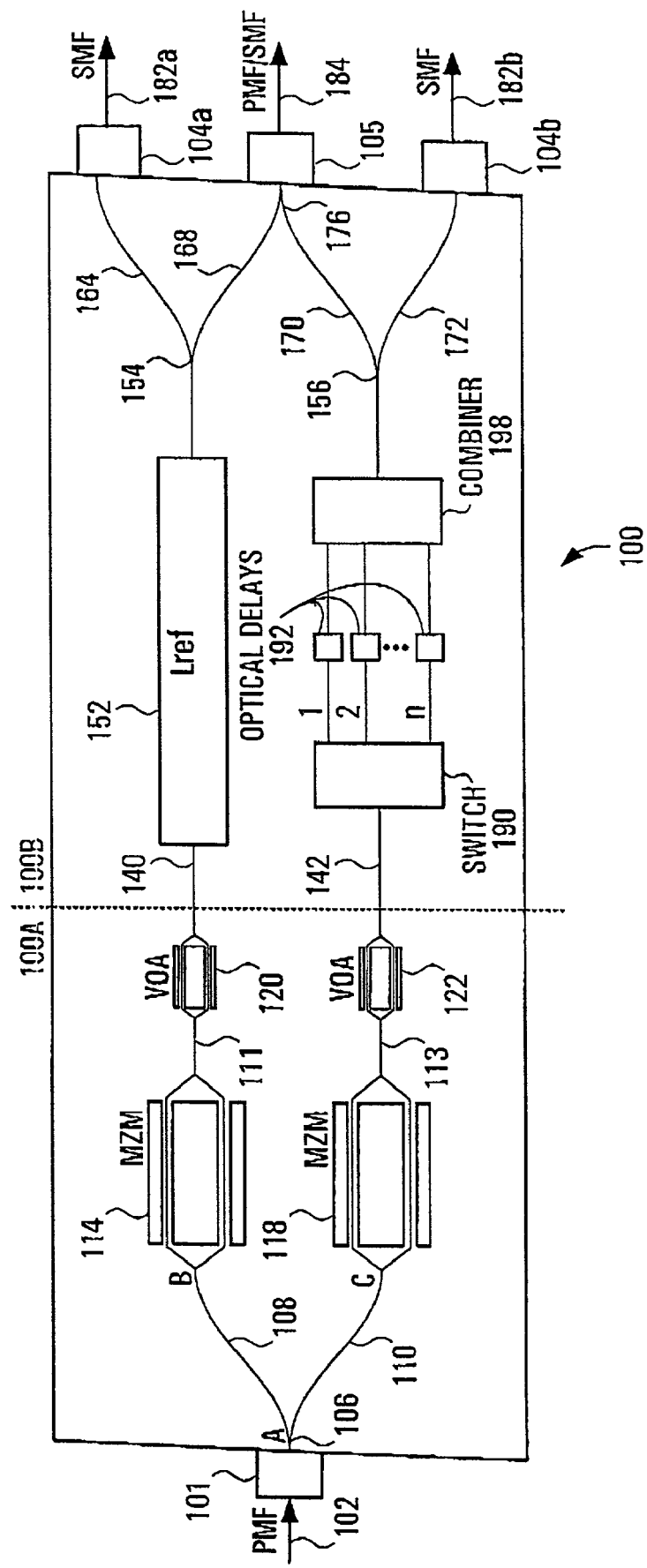
FIG. 1 depicts an integrated high-speed multiple-rate OTDM module constructed according to an embodiment of the invention utilizing an optical delay switching and combining array in a parallel configuration.

Referring to FIG. 1, an integrated high-speed multiple-rate OTDM module 100 constructed according to an embodiment of the invention utilizing an optical delay switching and combining array in a parallel configuration is described. For ease of description the multiple-rate OTDM module 100 will be discussed in terms of a twin-modulator portion 100A and a time-delay portion 100B, both described in more detail below.

A twin-modulator portion 100A of the multiple-rate OTDM module 100 receives an input signal (not shown) via an input polarization maintaining fiber (PMF) 102 having an end portion secured within a fiber tube 101. The waveguide structure of the twin-modulator portion 100A comprises a Y-branch junction 106 which divides the input signal delivered by the input PMF 102 among waveguide portions 108 and 110 denoted by paths AB and AC, respectively. The twin-modulation portion 100A of the multiple-rate OTDM module 100 comprises first and second Mach-Zehnder modulators 114 and 118 integrated on the same wafer whose outputs are fed, via waveguide portions 111 and 113, into first and second integrated variable optical attenuators (VOAs) 120 and 122, respectively. The outputs of VOAs 120 and 122 feed into waveguide portions 140 and 142, respectively of a time-delay portion 100B of the multiple-rate OTDM module 100. Therefore, a first optical path in the twin-modulator portion 100A of the multiple-rate OTDM module 100 comprises, in order, waveguide portion 108, MZM 114, waveguide portion 111, and VOA 120. Similarly, a second optical path in the twin-modulator portion 100A of the multiple-rate OTDM module 100 comprises waveguide portion 110, MZM 118, waveguide portion 113, and VOA 122.

The time-delay portion 100B of the multiple-rate OTDM module 100 comprises first and second waveguide portions 140 and 142 corresponding to VOA's 120 and 122, respectively, of the twin-modulator portion 100A. The first waveguide portion 140 of the time-delay portion 100B continues to a thermo-transducer (electrode) 152 integrated thereon for fine-tuning purposes. At a Y-branch junction 154 of the time-delay portion 100B of the multiple-rate OTDM module 100, 5 to 10% of the light travelling along waveguide portion 140 is divided into a waveguide arm 164 while 90 to 95% of the light is diverted into a waveguide portion 168. The second waveguide portion 142 continues to a 1:n optical switch 190 of the multiple-rate OTDM module 100. The 1:n optical switch 190 of this embodiment could be, for example, an electro-optic switch which comprises Y-branch junctions and an array of Mach-Zehnder waveguide configurations. The 1:n optical switch 190 is coupled to n optical delay elements 192 where n>1. The simplest example of an optical delay element is an integrated waveguide of length L, having an effective index of refraction of $n_{eff}$. The n optical delay elements 192 each act as optical waveguides which cause different optical delays. For the case of a simple integrated waveguide of length L, the optical delay T would then be $$T = \frac{n_{eff} L}{c}$$

where c is the speed of light in a vacuum.

The n optical delay elements 192 are coupled to an n:1 optical combiner 198 which is coupled to a waveguide continuing to Y-branch junction 156. The n:1 optical combiner 198 of this embodiment could be, for example, a configuration of Y-branch junctions and waveguides. It generally will be a passive component which does not require any control signal. The 1:n optical switch 190, the n optical delay elements 192, and the n:1 optical combiner 198 together form an optical delay switching and combining array of the time-delay portion 100B of the multiple-rate OTDM module 100. At the Y-branch junction 156, 5 to 10% of the light emerging from the optical combiner 198 is divided into a waveguide arm 172 while 90 to 95% of the light is diverted into a waveguide portion 170. Waveguide arms 164 and 172 are coupled to output single mode fibers (SMFs) 182a and 182b, respectively, end portions of which are secured within corresponding fiber tubes 104a and 104b. Waveguide portions 168 and 170 terminate at a junction 176 which is coupled to an output PMF/SMF 1834, having an end portion secured in a fiber tube 105.

In terms of operation, an optical short-pulse signal stream from a pulsed source e.g. clock pulse (not shown) arrives at the input of the multiple-rate OTDM module 100 via input PMF 102 secured in fiber tube 101. This short-pulse signal stream is then split by the Y-branch 106 among waveguide portions 108 and 110. The optical power splitting ratio at the Y-branch is 50%+/− h, the value h being a splitting ratio deviation in percentage and used to compensate for any power imbalance in the two optical paths (i.e. waveguide arms 108 and 110) due to, for example, imperfect processing. In the result, the optical powers of the input short-pulse signals presented to MZMs 114 and 118 will be the same.

However, the optical short-pulse signal streams will not generally arrive at their two corresponding MZM inputs at exactly the same time due to slight length differences between the waveguide portions 108 and 110. For a relatively large delay (>1 ps) between the two short-pulse signal streams at the MZM inputs, and assuming that the NRZ electrical gating signals (data streams), described below, are absolutely synchronized, one of the short-pulse signal streams will be somewhat out of alignment with its respective NRZ electrical gating signal. In such a case, an electrical phase shifter (not shown) may be required in the electrical feeding path to the particular MZM to compensate for any optical delay between paths AB 108 and AC 110. In this way, both NRZ Electrical gating signals will be well aligned with their respective optical short-pulse streams at each MZM 114, 118.

Of course, the RZ optical signal streams output from the MZMs 114, 118 may also not be totally in phase to allow proper interleaving with one another. As an example, consider the case of multiplexing two 40 Gbit/s electrical signals to create art 80 Gbit/s optical signal. The 40 Gbit/s RZ optical signals output from MZMs 114 and 118 may not totally be in phase and, furthermore, the delay introduced by the optical delay switching and combining array of the time-delay portion 100B of the multiple-rate OTDM module 100 might deviate from the required 12.5 picoseconds depending on processing accuracy. However, as will be discussed, the optical delay introduced by waveguide portion 140 for one of the RZ optical signal streams may be fine tuned via the thermo-transducer (electrode) 152 integrated thereon. Therefore, the total optical path difference (OPD) between the two RZ optical signal streams emerging from MZMs 314 and 118 may be compensated for by the optical delay introduced by the fine tuning of the thermo-transducer 152. As a result, the bits of one RZ optical signal stream may be: brought to the middle of the time slot of the other RZ optical signal stream, thereby allowing for proper interleaving.

At each MZM 114 and 118, a modulating electrical NRZ signal (not shown) is applied to gate the respective incoming short-pulse signal stream. For the specific example of multiplexing two 40 Gbit/s data streams into an 80 Gbit/s optical signal, the modulating signal for each MZM 114 and 118 may correspond, for example, to a 40 Gbit/s electrical NRZ data stream. The principle of operation behind MZMs is well known in the art and will not be detailed. Essentially, it is sufficient to know that MZMs 114 and 118 convert NRZ electrical data streams to corresponding RZ optical data streams.

The output power of each MZM 114 and 118 is then adjusted by respective VOAs 120 and 122. In other words, VOAs 120 and 122 are used for balancing the optical powers in both OTDM channels. As an aside, VOAs 120 and 122 may also be employed to apply low frequency modulation (dithering) to the two OTDM channels. The dither signal can be used, for example, to identify optical channel information. By detecting the optical power in each OTDM channel at fiber outputs 182a and 182b, the low frequency response may be fed back for controlling MZM settings such as bias voltage and RF swing. This type of controlling technology is well known in the art and will not be discussed. In any event, after passing through VOAs 120 and 122, the two optical RZ signal streams continue along respective waveguide portions 140 and 142.

The time-delay portion 100B of the multiple-rate OTDM module 100 is responsible for introducing a suitable delay between the RZ optical signal streams in order to facilitate interleaving of the signals. As seen in FIG. 1, the delay between two RZ signal streams is implemented by using an optical delay switching and combining array along optical waveguide portion 142. Although not used for the primary delay to facilitate interleaving, the waveguide portion 140 has some delay fine tuning capability associated with it. Specifically, fine tuning may be achieved by applying a voltage to the thermo-transducer (electrode Lref) 152 over the waveguide portion 140. The applied voltage introduces a certain change in temperature, leading to changes in the effective refractive index and waveguide properties of the waveguide portion below the electrode 152. In this manner, the optical path of the incoming light may be changed. In other words, the particular RZ signal stream travelling along the waveguide portion 140 is delayed proportional to the applied voltage. This fine-tuning capability is useful for example to correct for incorrect timing of signals due to total optical path difference (OPD) between the two RZ optical signal streams emerging from MZMs 114 and 118 as mentioned above, or small errors in the optical delay introduced by the optical delay switching and combining array, or to compensate for delay drift due to temperature changes. The incorporation of the optical delay switching and combining array along optical waveguide portion 142 is to introduce an optical delay of one half the period of the RZ signal streams travelling in waveguide portions 140 and 142 for proper time domain interleaving, and moreover, to provide a plurality of optical time delays which are appropriate for the interleaving of data streams having various bit rates. In this embodiment, which uses a parallel configuration, the 1:n optical switch 190 is controllably set by electrical control signals (not shown) to optically couple the optical waveguide portion 142 to one of the n parallel optical delay elements 192. The optical delay element chosen to be so controllably coupled will correspond to a delay appropriate for interleaving at a bit rate of the RZ signal pulses traversing waveguide portions 140 and 142. The choice of optical delay elements therefore dictates the choice of bit rates. The number of possible bit rates (corresponding to the number of possible optical delays) is n. As an example, data streams having bit rates of 20, 40, 80, and 160 Gbits/s could each be multiplexed by a single multiple-rite OTDM module 100 by incorporating four different optical delay elements each appropriate for multiplexing one of 20, 40, 80, and 160 Gbits/s signals and creating a delay of 25 ps, 12.5 ps, 6.25 ps, and 3.125 ps respectively. The n:1 optical combiner 198 operates to combine all possible paths through optical delay elements 192 so that a signal on waveguide portion 142 may continue to Y-branch 156 no matter which optical delay element it traverses. It should be noted that the desired multiple rates to be accommodated by the multiple-rate OTDM module 100 need not be related in any way and indeed may be very close to each other in value. For example, in OC 768 systems with forward error correction (FEC), the bit rate is 43 Gbit/s instead of 40 Gbit/s and an OTDM capable of multiplexing 40 and 43 Gbit/s would be desirable. In this case, the required optical delay for 43 Gbit/s will be 11.6 picoseconds instead of 12.5 picoseconds. In general when dealing with a first bit rate $B_1=R$ and a second bit rate which also includes additional overhead for, for example, forward error code correction digital wrapper, in the form $B_2=R(1+X)$. The delay times required for interleaving would respectively be $$T_1 = \frac{1}{2R},$$

and $$T_2 = \frac{1}{2R(1+X)},$$

and both rates could be achieved bad using appropriate optical delay elements 192 in a single multiple-rate OTDM module 100.

The introduction of the time delay between the RZ optical signal streams travelling in waveguides 140 and 142 requires a very high order of precision. To illustrate the high level of precision required, the delay required to produce an 80 Gbit/z RZ signal stream, for example, should be on the order of 12.5 ps+/−0.2 ps. This is also the reason why the NRZ transmission format is not generally used in OTDM implementation. Since there are no distinct transitions between adjacent "1" bits in an NRZ signal, the pulse width in an NRZ signal may, at times, grow too wide to allow for interleaving after the delay. The RZ transmission format, on the other hand, uses a pulse width smaller than 5 ps, for example, for 80 Gbit/s transmission (i.e. very small duty cycle) thereby leaving a large margin to play with between successive bits of data. In this way, two RZ signal streams may the interleaved (time division multiplexed) with minimal crosstalk.

Referring back to FIG. 1, the optical signal streams travelling along waveguide portions 140 and 142 continue into waveguide portions 168 and 170, respectively, toward junction 176. At junction 176, the two RZ optical signal streams are combined together via a power combiner to form a resulting RZ OTDM signal having twice the bit rate of the data streams on waveguide portions 140 and 142. In FIG. 1, junction 176 is schematically representative of any suitable power combiner available in the art which may be used for this purpose. Appropriate interleaving is achieved due to the different arrival time of the two signal streams. As an example, for 40 Gbit/s RZ signals, the bits of the RZ signal stream from waveguide portion 140 always arrive at junction 176 12.5 ps ahead of the bits of the RZ signal stream from waveguide portion 142, the resulting multiplexed signal being an 80 Gbit/s RZ signal.

The resulting RZ OTDM signal is then pushed onto the output PMF/SMF 184 secured in fiber tube 105. The choice of PMF or SMF here depends on what stage is chosen to follow the multiple-rate OTDM module 100. For example, if the OTDM signal corresponds to the OTDM transmitter output, SMF should be used. However, if the output of the multiple-rate OTDM module 100 is to be further connected to some amplification stage (e.g. semiconductor optical amplifiers), PMF should be used.

Junctions 154 and 156 are also designed to tap 5 to 10% of the optical power from the incoming RZ signal streams to waveguide, portions 164 and 172, respectively. The tapped signals subsequently provided to SMFs 182a and 182b may be utilized for monitoring of the individual OTDM channels. In this way, the bias voltage and RF swing of each MZM 114 and 118 may be optimally controlled.

The integrated OTDM modulator 100 of the present invention may be realized using conventional waveguide technology to form Optical waveguide paths on any suitable substrate and may be fabricated using advanced waveguide processing technology. Such processing technologies will not be detailed here as they should be well known to those skilled in the art. For example, the basic concepts underlying such processing technologies may be found in recent publications on integrated optics. Suitable substrates for this component should be well known to those skilled in the art and may be made using, for example, optically active materials such as Z-cut or X-cut lithium niobate (LiNbO3) or polymers. Alternative substrate technologies include III–V group semiconductors such as indium phosphide (InP), its ternary (e.g. InGaAs) or quaternary (e.g. InGaAsP) alloys. Depending on whether lithium niobate or indium phosphide is chosen as the substrate material, Mach-Zehnder modulators (MZMs) or electro-absorption modulators (EAMs) may be incorporated, respectively. The implementation of such modulators is very established in the art. In any case, the modulators should have a very high frequency response (i.e. greater than 30 GHz for 40 Gbit/s). The VOAs 120 and 122 only require a bandwidth of several MHz, enough for applying dithering. For the purposes of the present invention, it is sufficient to know that the each MZM 114, 118 is simply responsible for modulating its incoming optical short-pulse signal with NRZ electrical data (or RZ data) to produce an RZ optical signal stream.

Lithium niobate and indium phosphide waveguide structures usually exhibit some polarization dependence. Accordingly, the polarization state of incoming light may be held constant via the PMF 102. If an SOA which is normally pigtailed with the FMF is connected to the multiple-rate OTDM chip, the multiple-rate OTDM chip should be pigtailed with the PMF. Only in this manner will the polarization states of the optical signal be held constant which is necessary for use with an SOA.

Figure 2:
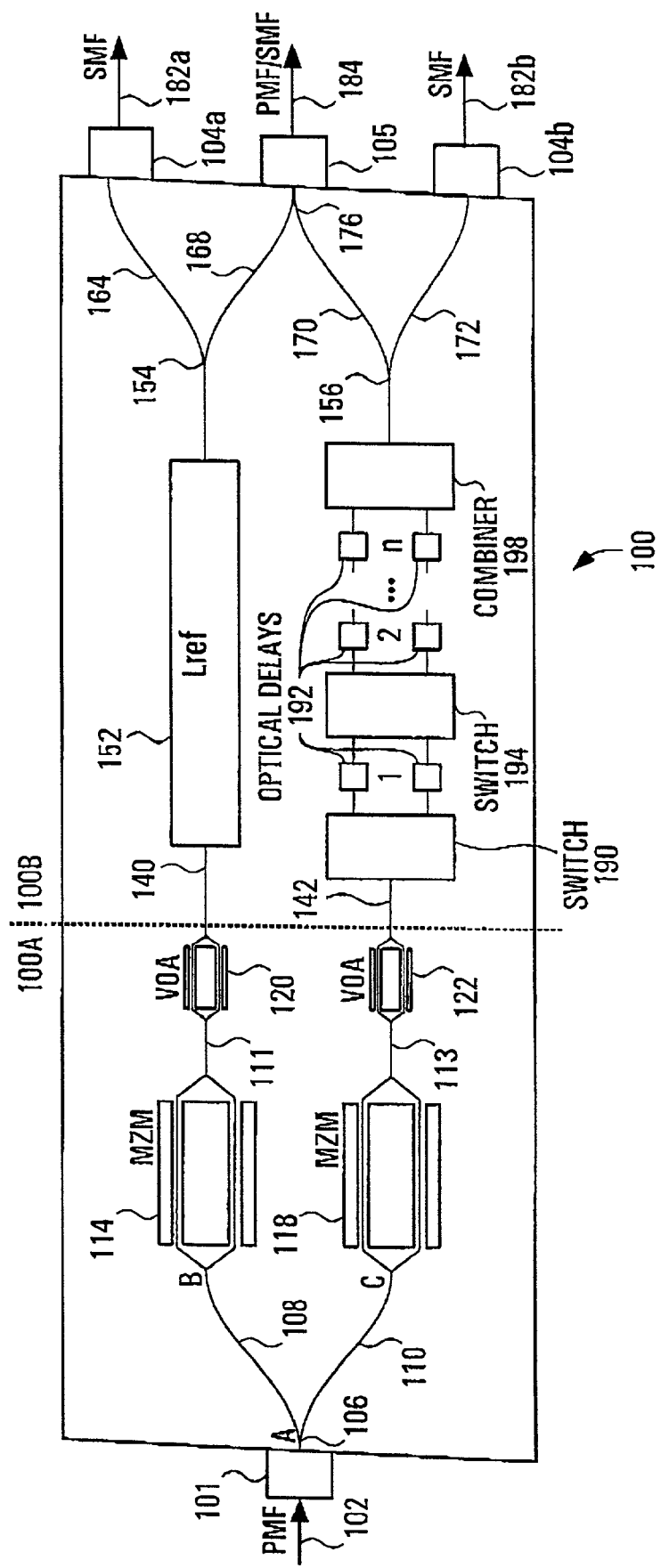
FIG. 2 depicts an integrated high-speed multiple-rate OTDM module constructed according to an embodiment of the invention utilizing an optical delay switching and combining array in a cascaded configuration.

Referring now to FIG. 2, an integrated high-speed multiple-rate OTDM module 100 constructed according to an embodiment of the invention utilizing an optical delay switching and combining array in a cascaded configuration is described. The multiple-rate OTDM module 100 of this embodiment is structured and functions the same as that described in association with FIG. 1 except only for the structure and function of the optical delay switching and combining array.

The optical delay switching and combining array of the embodiment depicted in FIG. 2 comprises a series of n optical switches and 2n optical delay elements 192, and an optical combiner 198. An input of a 1:2 optical switch 190 is coupled to the optical waveguide portion 142, The 1:2 optical switch 190 has two outputs which are coupled to a first pair of optical delay elements of the 2n optical delay elements 192, which are in turn coupled to a 2:2 optical switch 194. The 1:2 optical switch 190 together with the first pair of optical delay elements forms a first stage (labeled 1) of the optical delay switching and combining array. The 2:2 optical switch 194 is coupled to a second pair of optical delay elements which are coupled to a subsequent 2:2 optical switch (not shown). The 2:2 optical switch 194, together with the second pair of optical delay elements form a second stage (labeled 2) of the optical delay switching and combining array. The optical delay switching and combining array comprises n stages, each mth stage comprising a pair of delay elements coupled to an optical switch (also part of the $m^{th}$ stage) which is coupled to a pair of delay elements from the $(m-1)^{th}$ stage (except for m=1, wherein the switch is coupled to waveguide portion 142). The $n^{th}$ stage pair of optical delay elements are coupled to two inputs of a 2:1 combiner 198 which is coupled to a waveguide continuing to Y-branch junction 156.

In terms of operation, as was described in association with FIG. 1, the incorporation of the optical delay switching and combining array along optical waveguide portion 142 is to introduce an optical delay of one half the period of the RZ signal streams travelling in waveguide portions 140 and 142 for proper time domain interleaving, and moreover, to provide a plurality of optical time delays which are appropriate for the interleaving of data streams having various bit rates. In this embodiment, which uses a cascaded configuration, the n optical switches 190, 194, etc. are controllably set by electrical control signals (not shown) to optically couple the optical waveguide portion 142 to a selection of n optical delay elements 192, one chosen from each stage of the optical delay switching and combining array. The optical delay of the optical delay elements chosen to be controllably optically coupled will add up to a delay appropriate for interleaving at a bit rate of the RZ signal pulses traversing waveguide portions 140 and 142. If the 2n optical delay elements provide unique optical delays then the number of possible delays and hence the number of possible bit rates is $2^n$. If however some stages of the cascade contain delay elements causing the same optical delay as elements from other stages, there will be redundancy and the number of total possible delays (and bit rates) will be less than $2^n$. The 2:1 optical combiner 198 operates to combine its two inputs so that a signal on waveguide portion 142 which has been delayed by the n stages may continue to Y-branch 156 no matter which input of the 2:1 optical combiner 198 it enters.

Figure 3:
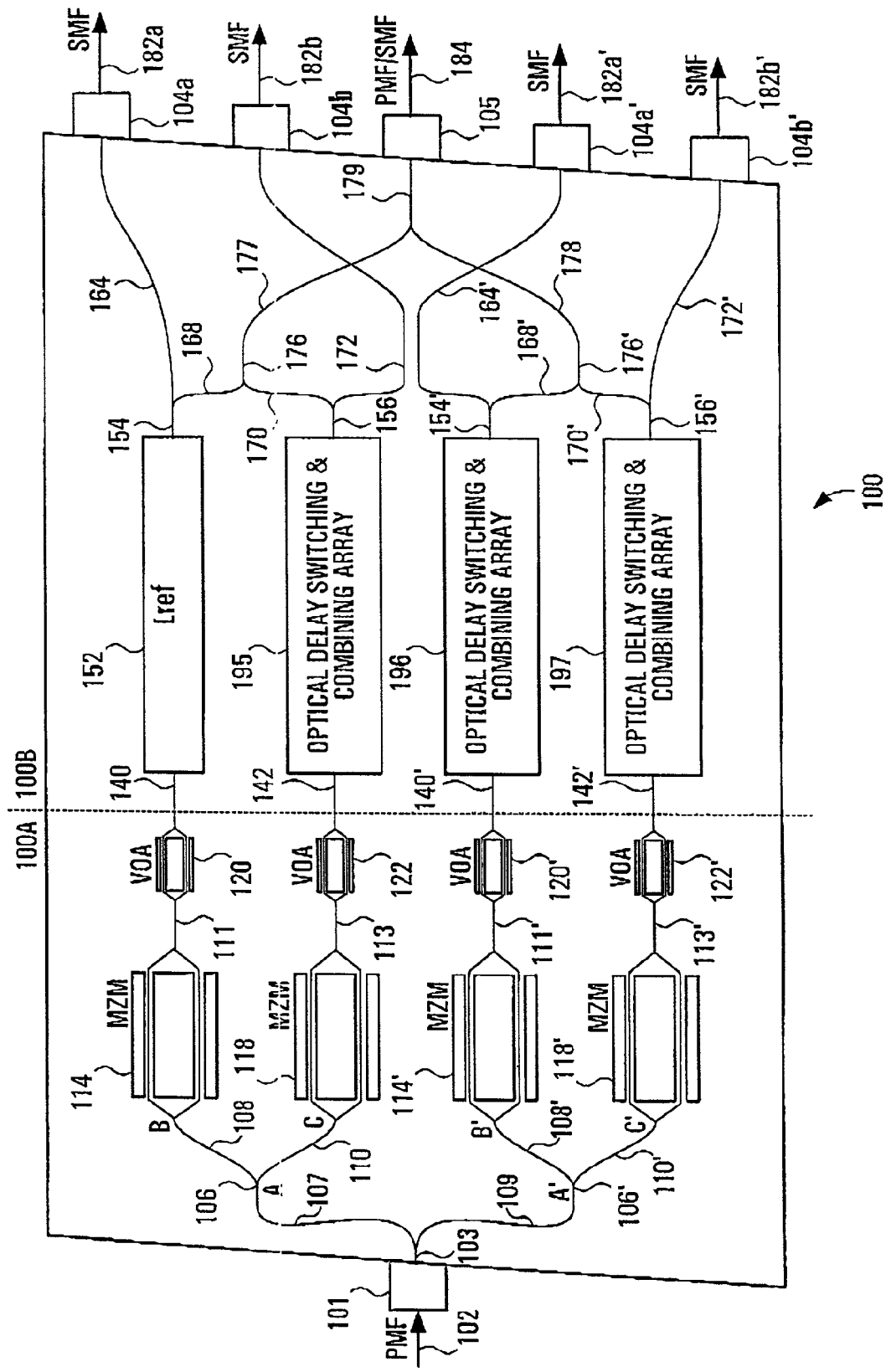
FIG. 3 depicts an integrated high-speed multiple-rate OTDM module constructed according to an embodiment of the invention utilizing multiple optical delay switching and combining arrays.

Referring to FIG. 3, an integrated high-speed multiple-rate OTDM module 100 constructed according to an embodiment of the invention utilizing multiple optical delay switching and combining arrays is described. In this preferred embodiment, four Mach-Zehnder-Modulators are implemented in a multiple-rate OTDM module 100, although it is presented to generally illustrate how embodiments according to the invention using multiple optical delay switching and combining array configurations may be achieved.

As for the embodiments described in association with FIGS. 1, and 2, the multiple-rate OTDM module 100 receives an input signal (not shown) via an input polarization maintaining fiber (PMF) 102 having an end portion secured within a fiber tube 101. A Y-branch junction 103 divides the input signal delivered by the input PMF 102 among waveguide portions 107 and 109 to Y-branch junctions 106 and 106' respectively denoted A and A'.

For sake of discussion, the optical paths and subsequent components leading from A will be referred to as the upper arm of the multiple-rate OTDM module 100, while the paths and subsequent components leading from A' will be referred to as the Lower arm of the multiple-rate OTDM module 100. Each of the upper and lower arms comprise a set of subsequent components and paths identical in structure and function to the twin-modulator portion 100A of the embodiments depicted in FIGS. 1 and 2. These paths and components of the upper arm are numbered the same as those paths and components of FIGS. 1 and 2 while these paths and components of the lower arm are numbered using the same numbers with primes ('). Each of the upper and the lower arms also has a set of optical paths and subsequent components which correspond to those of the time-delay portion 100B of the embodiments depicted in FIGS. 1 and 2. Each arm has optical waveguide paths leading from their respective VOAs into various delay elements, namely optical waveguide portions 140, 142, for the upper arm, and waveguide portions 140', and 142' for the lower arm.

As was described with respect to the embodiments depicted in FIGS. 1 and 2, the time-delay portion 100B of the upper arm comprises a first waveguide portion 140 which continues to a thermo-transducer (electrode) 152 integrated thereon for fine-tuning purposes. At a Y-branch junction 154 of the time-delay portion 100B of the upper arm, 5 to 10% of the light travelling along waveguide portion 140 is divided into a waveguide arm 164 while 90 to 95% of the light is diverted into a waveguide portion 168. The second waveguide portion 1412 continues to an optical delay switching and combining array 195. The optical delay switching and combining array 195 may be configured as was described in the preferred embodiments depicted in FIGS. 1 and 2, namely as a parallel configuration or as a cascaded configuration, or as any configuration which controllably couples with portion 142 an optical delay element or elements appropriate for interleaving an RZ data stream at a desired rate. In general the optical delay switching and combining array 195 may comprise any combination of switches, optical delay elements, and combiners which may be controllably set to effect a desired optical delay to signals traversing optical waveguide portion 142. The optical delay switching and combining array 195 is coupled to a waveguide continuing to Y-branch junction 156. At the Y-branch junction 156, 5 to 10% of the light emerging from the optical delay switching and combining array 195 is divided into a waveguide arm 172 while 90 to 95% of the light is diverted into a waveguide portion 170. Waveguide arms 164 and 172 area coupled to output single mode fibers (SMFs) 182a and 182b, respectively, end portions of which are secured within Corresponding fiber tubes 104a and 104b. Waveguide portions 168 and 170 terminate at a junction 176 which is coupled to waveguide arm 177. Waveguide arm 177 terminates at a junction 179 which is coupled to an output PMF/SMF 184, having an end portion secured in a fiber tube 105.

The time-delay portion 100B of the lower arm differs from the upper arm in that the lower arm comprises a first waveguide portion 140' which continues to a second optical delay switching and combining array 196 which is coupled to a Y-branch junction 154'. At Y-branch junction 154' of the time-delay portion 100B of the lower arm, 5 to 10% of the light emerging from the optical delay switching and combining array 196 is divided into a waveguide arm 164' while 90 to 95% of the light is diverted into a waveguide portion 168'. The second waveguide portion 142' continues to a third optical delay switching and combining array 197. The optical delay switching and combining arrays 196 and 197 may be configured as was described in the preferred embodiments depicted in FIGS. 1 and 2, namely as parallel configurations or as cascaded configurations, or as any configuration which controllably couples with respective portions 140' and 142' optical delay elements appropriate for interleaving RZ data streams at a desired rate, In general the optical delay switching and combining arrays 196 and 197 may comprise any combination of switches, optical delay elements, and combiners which may be controllably set to effect a desired optical delay to signals traversing optical waveguide portion 140' and 142'. The optical delay switching and combining array 197 is coupled to a waveguide continuing to Y-branch junction 156'. At the Y-branch junction 156', 5 to 10% of the light emerging from the optical delay switching and combining array 197 is divided into a waveguide arm 172' while 90 to 95% of the light is diverted into a waveguide portion 170'. Waveguide arms 164' and 172' are coupled to output single mode fibers (SMFs) 182a' and 182b', respectively, end portions of which are secured within corresponding fiber tubes 104a' and 104b'. Waveguide portions 168' and 170' terminate at a junction 176' which is coupled to waveguide arm 178. Waveguide arm 178 terminates at the junction 179.

In terms of operation, an optical short-pulse signal stream from a pulsed source e.g. clock pulse (not shown) arrives at the input of the multiple-rate OTDM module 100 via input PMF 102 secured in fiber tube 101. This short-pulse signal stream is then split by the Y-branch 103 among waveguide portions 107 and 109, and further split at Y-branches 106 and 106'. The optical power splitting ratio at each Y-branch is 50%+/− $h_i$, the value $h_i$ being a splitting ratio deviation in percentage and used to compensate for any power imbalance in the two optical paths emerging from the $i^{th}$ Y-branch due to, for example, imperfect processing. In the result, the optical powers of the input short-pulse signals presented to all four arms 108, 110, 108', and 110' will be the same.

However, the optical short-pulse signal streams will not generally arrive at the four corresponding MZM inputs at exactly the same time due to slight length differences between the waveguide portions 107 and 109, between the waveguide portions 108 and 110, and between the waveguide portions 108' and 110'. For a relatively large delay (>1 ps) between the four short-pulse signal streams at the MZM inputs, and assuming that the NRZ electrical gating signals (data streams), described below, are absolutely synchronized, some of the short-pulse signal streams will be somewhat out of alignment with its respective NRZ electrical gating signal. In such a case, electrical phase shifters (not shown) may be required in the electrical feeding path to the particular MZM to compensate for any optical delay between paths 107 and 109, 108 and 110, and 108' and 110'. In this way, all four NRZ electrical gating signals will be well aligned with their respective optical short-pulse streams at each MZM 114, 118, 114' and 118'.

At each MZM 114, 118, 114' and 118' a modulating electrical NRZ signal (not shown) is applied to gate the respective incoming short-pulse signal stream as was described above, generating RZ optical data streams.

The output power of each MZM 114, 118, 114', and 118' is then adjusted by respective VOAs 120, 122, 120' and 122'. In other words, VOAs 120, 122, 120', and 122' are used for balancing the optical powers in the four OTDM channels. As an aside, VOAs 120 122, 120', and 122' may also be employed to apply low frequency modulation (dithering) to the four OTDM channels. Then, by detecting the optical power in each OTDM channel at fiber outputs 182a, 182b, 182a', and 182b', the low frequency response may be fed back for controlling MZM settings such as bias voltage and RF swing. This type of controlling technology is well known in the art and will not be discussed. In any event, after passing through VOAs 120, 122, 120', and 122' the four optical RZ signal streams continue along respective waveguide portions 140, 142, 140', and 142' into the time-delay portions of the upper and lower arms of the multiple-rate OTDM module 100.

The time-delay portions of the upper and lower arms of the multiple-rate OTDM module 100 are responsible for introducing suitable delays between the RZ optical signal streams on waveguide portions 140, 142, 140' 142' in order to facilitate interleaving of tho signals. As soon in FIG. 3, the delay between four RZ signal streams is implemented by using an optical delay switching and combining array 195 along optical waveguide portion 142, an optical delay switching and combining array 196 along optical waveguide portion 140', and an optical delay switching and combining array 197 along optical waveguide portion 142' . Although not used for the primary delay to facilitate interleaving, the waveguide portion 140 has some delay fine tuning capability associated with it, Specifically, fine tuning may be achieved by applying a voltage to the thermo-transducer (electrode Lref) 152 over the waveguide portion 140 as was described above. This fine-tuning capability is useful for fining tuning the delay along that optical waveguide portion 140 whose timing may be used as a global reference for the remaining RZ signal streams. The incorporation of the optical delay switching and combining arrays 195, 196, and 197 along respective optical waveguide portions 142, 140', and 142' is to introduce optical delays of one quarter, one half, and three quarters the period of the RZ signal streams travelling in waveguide portions 140, 142, 140', and 142' for proper time domain interleaving, and moreover, to provide a plurality of optical time delays which are appropriate for the interleaving of data streams having various bit rates. It does not matter which of the optical delay switching and combining arrays 195, 196, and 197 provide delays of one quarter, one half, and three quarters the period of the RZ signal streams, only that all three of these delays are provided, so that when these delayed data streams travelling in waveguide portions 142, 140', and 142' are combined with the data stream on waveguide 140 whose delay is only fine tuned, a data stream having four times the data rate as the data streams travelling in waveguide portions 140, 142, 140', and 142' is produced. The optical signal streams coming from waveguides 140, and 142 continue into waveguide portions 168, and 170 toward junction 176, while optical signal streams coming from waveguides 140', and 142' continue into waveguide portions 168', and 170' toward junction 176'. At junction 176, its two respective input RZ optical signal streams are combined together via a power combiner, the resulting signal of which continues along waveguide 177. At junction 176', its two respective input RZ optical signal streams are combined together via a power combiner the resulting signal of which continues along waveguide 178. The optical signal streams travelling along waveguides 177, and 178 travel toward junction 179 where they are combined together via a power combiner to form an AZ signal having four times the bit rate of the optical signal streams travelling along waveguides 140, 142, 140' and 142'. In FIG. 3, junctions 176, 176', and 179 are schematically representative of any suitable power combiner available in the art which may be used for this purpose. Appropriate interleaving is achieved due to the different arrival time of the four signal streams. As an example, for 20 Gbit/s RZ signal, the bits of the RZ signal streams from any one of waveguide portions 140, 142, 140', and 142' always arrive at junction 179 at least 12.5 ps ahead or behind the bits of the RZ signal streams from any other of the waveguide portions 140, 142, 140.', and 142' resulting in an 80 Gbit/s RZ OTDM signal.

The resulting RZ OTDM signal is then pushed onto the output PMF/SMF 184 secured in fiber tube 105. As described above, the choice of PMF or SMF here depends on what stage is chosen to follow the multiple-rate OTDM module 100.

Junctions 154, 156, 154' and 156' are designed to tap 5 to 10% of the optical power from the incoming RZ signal streams to waveguide portions 164, 172, 164' and 172' respectively. As with embodiments described above, the tapped signals subsequently provided to SMFs (182a, 182b, 182a', and 182b') may be utilized for monitoring of the individual OTDM channels. In this way, the bias voltage and RF swing of each MZM 114, 118, 114', and 118' may be optimally controlled.

The multiple optical delay switching and combining array configuration illustrated employs the use of four MZMS, a pair each used in each of the upper and the lower arms of the integrated multiple-rate OTDM module 100. In general the principle illustrated by this embodiment is that any number of data Stream signals may be combined according to the invention, bit splitting an optical short-pulse signal stream from a pulsed source by an appropriate arrangement of Y-branch splitters, passing each RZ optical pulse stream through appropriate MZMs and VOAs, delaying each emerging data stream by an appropriate amount using optical delay switching and combining arrays, and thermo-transducers, and recombining the data streams into a resulting OTDM signal. There is no limitation on the number of data streams to be multiplexed and hence the number of MZMs on the same chip. Particularly, in the case where the number of data streams to be multiplexed is not a power of 2, the Y-branch splitters, may be adapted to split signals according to a power splitting ratio other than 50%+/– h. As an example, a multiple optical delay switching and combining array configuration for multiplexing three optical streams and utilizing three MZMs could use a first Y-branch splitter having a 66.6%+/– $h_1$ to 33.3%–/+ $h_1$ power splitting ratio to split the optical input pulse stream. In this case $h_1$ is a minor compensating factor for loss between channels. The optical branch carrying the 66.6% signal would then be fed into a Y-branch splitter having a 50%+/– $h_2$ power ratio. The result would be three signals having the same signal strength of about 33.3% power of the original signal. With respect to the desired time delays, assuming a desired OTDM data stream has even spacing between data bits, for an OTDM multiplexing n RZ data streams, at least n−1 different delays should be employed. The value of the n−1 delays would be Tj/n where j∈{1, . . . , n−1}, and where T is the period of the n RZ data streams. It is to be understood that FIG. 3 is only one embodiment which serves as a specific example of the general architecture for a multiple optical delay switching and combining array integrated multiple-rate OTDM module, which can be constructed according to the invention.

Figure 4:
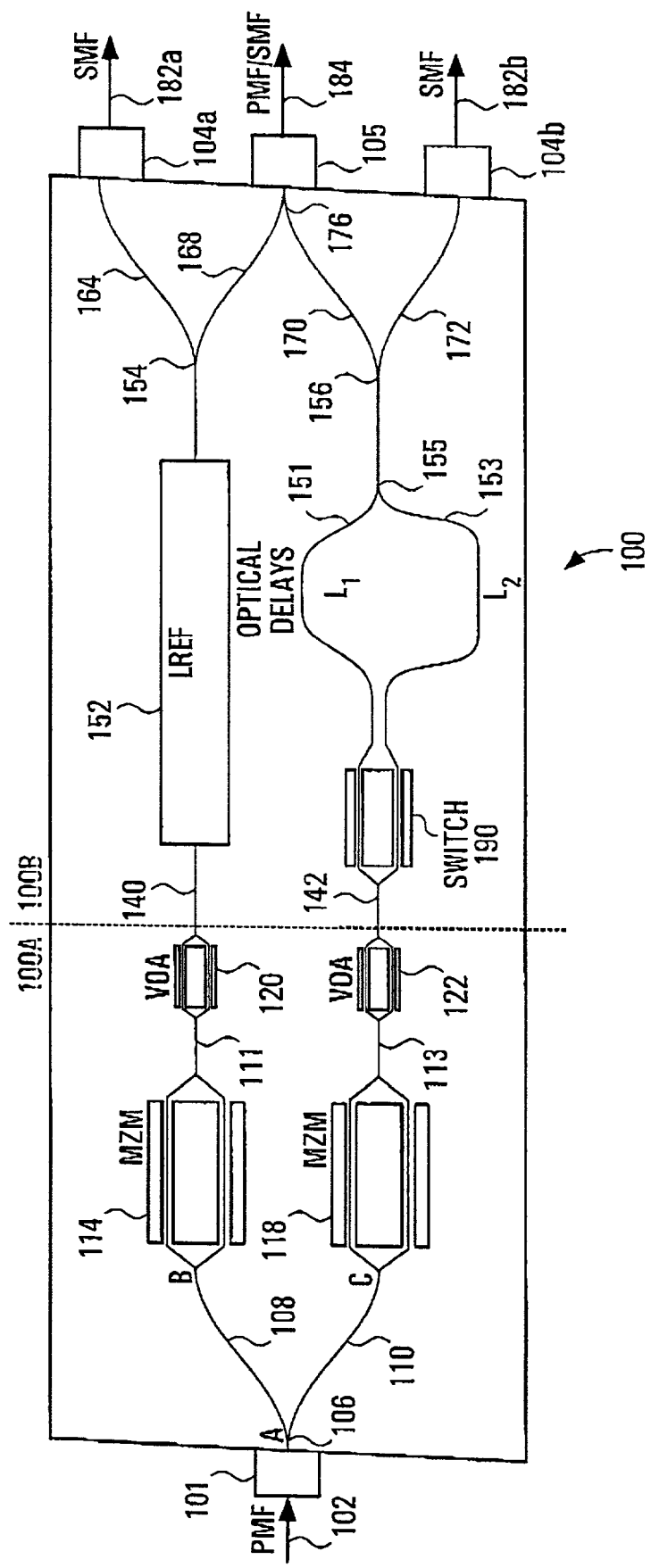
FIG. 4 depicts an integrated high-speed multiple-rate OTDM module constructed according to an embodiment of the invention utilizing an optical delay switching and combining array in a parallel configuration of order 2 using simple integrated waveguides as optical delay elements.

Referring now to FIG. 4, an integrated high-speed multiple-rate OTDM module 100 constructed according to an embodiment of the invention utilizing an optical delay switching and combining array in a parallel configuration of order 2 is described. The multiple-rate OTDM module 100 of this embodiment is a specific example of the embodiment described in association with FIG. 1, utilizing a pair of simple integrated waveguides for optical delay elements 192.

The optical delay switching and combining array of the embodiment depicted in FIG. 4 comprises a 1:2 switch 190, whose single input is coupled to waveguide portion 142, two waveguides of differing length serving as two optical delay elements $L_1$, 151 and $L_2$ 153, coupled to two outputs of the 1:2 switch 190. The two optical delay elements $L_1$ 151 and $L_2$ 153 terminate at junction 155 which is any suitable power combiner for combining the data streams traversing 151 and 153. The two integrated waveguides serving as optical delay elements $L_1$ 151 and $L_2$ 153 are of differing lengths $L_1$ and $L_2$. In terms of function, all optical delay switching and combining arrays function to controllably provide multiple optical delays for facilitating signal interleaving. In this embodiment, the 1:2 switch 190 is used to controllably couple optical delay element $L_1$ 151 or $L_2$ 153 to the waveguide portion 142 providing two optical delays and hence facilitating signal interleaving for two possible bit rates. As described above, in the case of a simple integrated waveguide of length L serving as an optical delay element, the amount of delay is $$T = \frac{n_{\it eff} L}{c},$$

and hence the two optical delays provided by $L_1$ 151 and $L_2$ 153 are $$T_1 = \frac{n_{\it eff} L_1}{c}, \quad T_2 = \frac{n_{\it eff} L_2}{c}.$$

In all other respects the integrated multiple-rate OTDM module 100 functions the same as the embodiment described in association with FIG. 1.

Although the preferred embodiments described employ a combiner in the optical delay switching and combining array, a switch could be used in place of it, in which case it would be controllably set to couple the optical delay element on which the optical RZ data stream was travelling to an output of the optical delay switching and combining array.

Although the preferred embodiments described employ one less optical delay switching and combining array than there are optical RZ signal streams being multiplexed, it is to be understood that the number of optical delay switching and combining arrays could equal the number of optical RZ signal streams being multiplexed, as long as appropriate delays ace introduced to facilitate time domain interleaving. Moreover, in alternate arrangements, each optical delay switching and combining array may even facilitate the delays of more than one optical RZ optical signal stream, and have more than one output. As an example, in FIG. 3, the optical delay switching and combining arrays 195, 196, and 197 could be replaced with one more complex optical delay switching and combining array having three inputs and three outputs and designed to provide multiple delays to each optical RZ signal passing therethrough. In general there is no specific limit on the number of optical delay switching and combining arrays to be employed for providing optical delays to facilitate time domain interleaving in a multiple-rate OTDM module constructed according to the invention.

Similarly, although the preferred embodiments described employ only one thermo-transducer 152 along, for example, waveguide portion 140 on which there is no optical delay switching and combining array, some embodiments may include a thermo-transducer on waveguide portions associated with each optical delay switching and combining arrays. For example along waveguide portions 142, 140', and 142' as shown in FIG. 3. This may be useful for fine tuning delays to compensate for errors in timing created by the optical delay switching and combining arrays themselves. In general there is no specific limit on the number of thermo-transducers to be employed for fine-tuning purposes in a multiple-rate OTDM module constructed according to the invention.

The multiple-rate OTDM module of the present invention may be designed to operate at any optical wavelength in the 1300 nm–1630 nm wavelength band. In each of the embodiments depicted, polished facets at both sides of the integrated OTDM nodule may be angled at, for example, between 6 to 8 degrees, to enhance back-reflection suppression. This feature is demonstrated in FIGS. 1 to 4 by the two angled end facets of the integrated multiple-rate OTDM module 100, and in FIG. 5 by the two angled end facets of the integrated multiple-rate OTDM chip 560.

OTDM-based solutions are only now emerging as alternatives to existing DWDM solutions for meeting the bandwidth demands of the telecommunications industry. However, current OTDM-based solutions depend on the use of varying fiber lengths to achieve the prescribed optical delays required for interleaving of the various OTDM channels. Such solutions suffer from stability problems and offer no fine tuning capabilities nor multiple rate selection since the optical delay is necessarily fixed by the length of the appropriate fiber. In other words, fiber-based OTDM solutions do not provide a tunability or selection mechanism as may be required by OC768 systems, for example, where the bit rates prior to interleaving may vary from 40 Gbit/s to 43 Gbit/s depending upon whether forward error correction (FEC) is used, or in general when using an OTDM in any system or application which uses multiple data rates.

The multiple-rate OTDM module also has the advantage of being instantly upgradable in so far as upgrading from a low bit-rate to a higher bit-rate. For example, when upgrading a 40 Gbit/s system to a 80 Gbit/s system, a multiple-rate OTDM capable of both bit-rates can provide an instant solution for the 80 Gbit/s network, which otherwise would require the replacement of all existing 40 Gbit/s multiplexing modules with newly designed 80 Gbit/s multiplexing modules.

The one chip implementation of the illustrated embodiments is advantageous at least for the reasons that it reduces overall chip dimension which is suitable for application in optical modules. Conventional fiber-based OTDM technology is bulky and complicated. Having the key components of the multiple-rate OTDM module integrated on a single chip aids in reducing the complexity as well as lowering the cost for assembly, and aids in reducing signal loss that can occur in chip-to-chip connections. Specifically, the delay of the present invention is introduced via well known integrated chip solutions i.e. titanium indiffusion for lithium niobate and reactive ion etching for III-V group semiconductor. This waveguide process technology is widely used in the art for the fabrication of other integrated optical components.

Although embodiments of the present invention have only been described in relation to multiplexing two or four electrical NRZ data streams into a single high-speed optical RZ stream, it should be obvious that the invention is not limited to 2×1 or 4×1 multiplexing and may be extended to 8×1, 16×1 etc. or in general to n×1 multiplexing schemes. For example, a modulator chip with eight MZMs may be used to produce eight optical RZ signal streams (at for example 20 Gbps) which may then be combined in a time-delay portion 100B having seven optical delay switching and combining arrays to generate an even higher-speed output signal (at for example 160 Gbits). In other words, the simple embodiments described herein may be extended to achieve even higher data rate systems.

Although the embodiments depicted in figures each show an integrated multiple-rate OTDM module, some embodiments constructed according to the invention will be multiple-rate OTDM modules which are not integrated or which may comprise some components which are integrated and some which are not. Such embodiments may be constructed with any number of well known analogous respective non-integrated free-space optical components, arranged and functioning in some equivalent manner to those illustrated in the figures and the accompanying descriptive passages, replacing and corresponding to the integrated components therein. Although the free-space optics technique of working the invention is relatively bulky and produces greater optical loss, it achieves at least the multiple-rate OTDM capability which is an advantageous aspect of the integrated embodiments of the invention.

Figure 5:
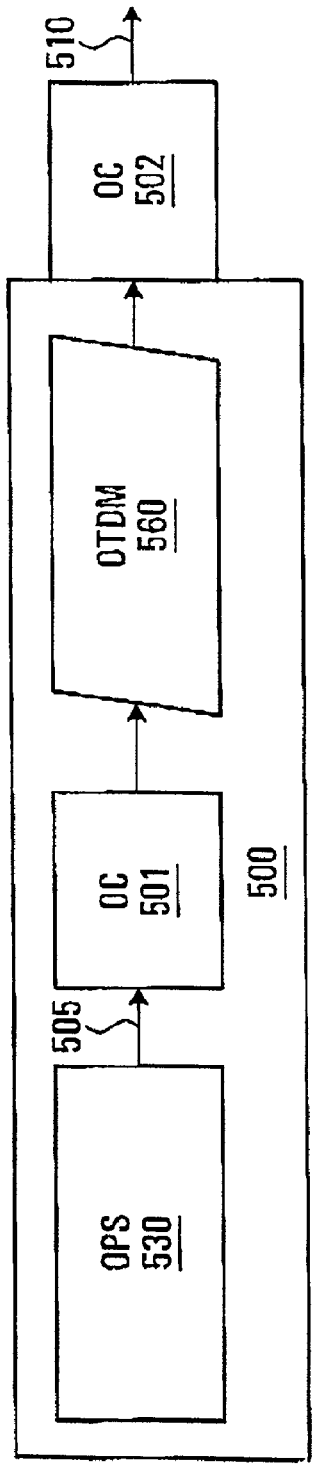
FIG. 5 depicts an integrated OTDM subsystem with an optical pulse source (OPS) and a multiple-rate OTDM chip constructed according to an embodiment of the invention.

Referring to FIG. 5 an integrated OTDM subsystem with an optical pulse source (OPS) and a multiple-rate OTDM chip constructed according to an embodiment of the invention is described. The OTDM subsystem, comprising an OPS chip, a multiple-rate OTDM chip, and optical connections OCs, constructed according to the invention can be integrated in a single substrate or platform advantageously using hybrid packaging technology. The OPS chip and the multiple-rate OTDM chip may be made with different materials and can be integrated on a single platform using suitable optical techniques. In such a case, for example, a metallic platform could be employed to dissipate the heat generated by the laser source of the OPS.

The integrated OTDM subsystem 500 comprises an optical pulse source (OPS) 530, whose output 505 traverses optical connections (OC) 501. Optical connections (OC) 501 may be inside or attached to the OTDM subsystem and may comprise or employ optical components or techniques from free-space optics, fiber-optics, micro-optics or wave-guide optics. Optical connections 501 are connected to an input of the multiple-rates OTDM chip 560 whose output is connected to OC 502. Several problems may arise in implementing the optical connections 501, including polarization mismatching, optical power loss and optical reflection. The manner in which these problems are dealt with will depend upon which techniques are used for the optical connections 501.

If a free-space optics approach is taken, the polarization axes of the OPS chip 530 and the multiple-rate OTDM chip 560 should be aligned as much as possible since the performance of the multiple-rate OTDM chip 560 is polarization dependent. In this approach, a lens or lens combination is inserted between the two chips to collect all optical power from the OPS chip 530 to focus/couple that optical power to the multiple-rate OTDM chip 560. Anti-reflection coatings are applied to the lens surfaces to minimize optical reflection. Furthermore, the coupling angle of the light rays should match the numerical apertures of the waveguides to enhance the coupling efficiency. In this case PM fiber is not required on the multiple-rate OTDM chip 560 as shown in FIGS. 1 to 4.

If a micro-optics approach is taken, as with the free-space optics approach, the polarization axes of the OPS chip 530 and the multiple-rate OTDM chip 560 should be aligned as much as possible. In this approach, a graded-index (GRIN) lens or lenses are inserted between the two chips to collect all optical power from the OPS chip 530 to focus/couple that optical power to the multiple-rate OTDM chip 560. To minimize optical reflection, reflective-index matching epoxy is applied between the GRIN lens or lenses and the multiple-rate OTDM chip 560. As in free-space optics approaches, the coupling angle of the light rays should match the numerical apertures of the waveguides to enhance the coupling efficiency, and PM fiber is not required on the multiple-rate OTDM chip 560.

If a fiber-optics approach is taken, the polarization axes of the OPS chip 530 should be matched with the lensed PM fiber implemented to collect the light output from the OPS chip 530. As the polarization axis of the PM fiber at the multiple-rate OTDM chip 560 is already aligned to the multiple-rate OTDM chip 560, polarization axes of the OPS chip 530 and this multiple-rate OTDM chip 560 can be automatically matched if the axes of two PMFs are aligned. The alignment of the polarization axes of the PM fibers can be performed by employing a PM fiber fusion splicer. The power coupling and optical reflection at the fiber ends can also be enhanced and minimized respectively.

For implementing a preferred embodiment of an integrated OTDM subsystem, the optical connections 501 are employed using a wave-guide optics approach. In this approach a single polarization maintaining waveguide can be employed between the OPS chip 530 and the multiple-rate OTDM chip 560 which are integrated onto a single platform. In this embodiment, the input waveguide of the multiple-rate OTDM chip 560 can starve as this single PM waveguide. The polarization axis of the OPS chip 530 can simply match that of the PM waveguide by adjusting its physical orientation. After aligning the polarization axes, the OPS chip 530 can be attached to the multiple-rate OTDM chip 560 by using an epoxy. Alternatively, the output of the OPS chip 530 can be coupled to the waveguide using a micro-lens. The output of OC 502 forms the output signal of the OTDM subsystem and will comprise a multiplexed OTDM data stream. The wavelength of this output can be fixed or tunable and it can match the ITU grid for optical communication. OTDM subsystem outputs can be used with different optical communication technologies. This approach is relatively simple, cost effective, and addresses the issues of polarization matching, power loss and optical reflection.

In terms of functionality, the OPS chip 530 generates an appropriate optical pulse stream for use by the multiple-rate OTDM chip 560 for optical time multiplexing. The pulse stream, typically an RZ pulse stream is an optical short-pulse signal stream as described above in association with input 102 and is provided to the multiple-rate OTDM chip 560 via optical connections 505. The OTDM signal output by the multiple-rate OTDM chip 560 is output through optical connections 502, and forms the multiplexed output 510 of the OTDM subsystem.

Figure 6:
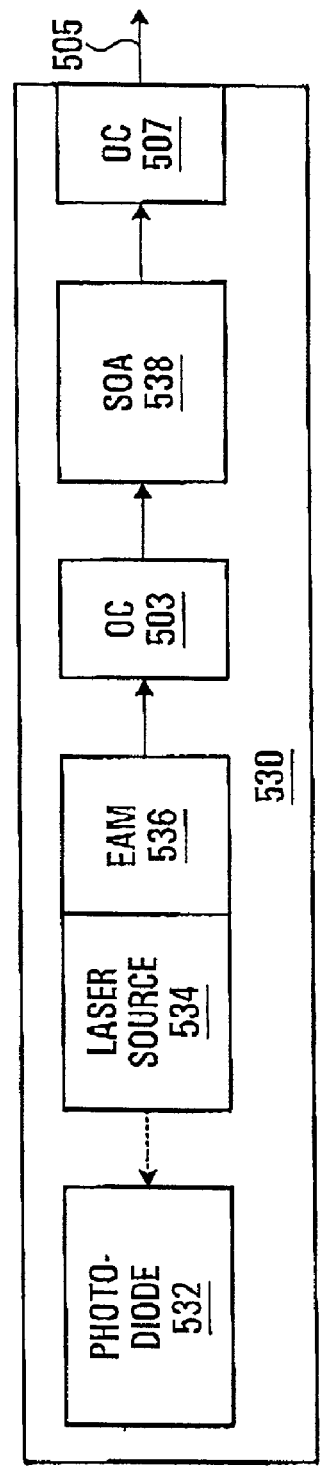
FIG. 6 depicts an optical pulse source (OPS) as shown in FIG. 5 constructed according to an embodiment of the invention.

Referring to FIG. 6 an optical pulse source (OPS) as shown in FIG. 5 constructed according to an embodiment of the invention is described. The OPS chip 530 can be made of a semiconducting material as a single chip but is not limited to such a construction. The OPS 530 comprises a photo-diode 532, which is weakly coupled to a back surface of a continuous wave (CW) laser source 534 which could be any kind of laser used in optical communication for example DFB (Distributed FeedBack), DBR (Distributed Bragg Reflector), and tunable semiconductor lasers. The laser source 534 outputs an optical signal to an electro-absorption modulator (SAM) 536 which are both integrated on the same semiconductor chip. The EAM 536 is coupled via OC 503 to a semiconductor optical amplifier (SOA) 538. The SOA is coupled via OC 507 to OC 501 as depicted in FIG. 5.

In terms 0f function, the photodiode 532 operates to monitor the power of the laser source 534. The laser source 534 produces a continuous optical signal to be gated into a pulsed output. The output of the laser source is provided to the EAM 536 for gating. The modulation frequency of the EAM and hence the frequency of the resulting pulse output is set to match the bit-rate of the data streams to be multiplexed in the multiple-rate OTDM chip 560. As mentioned above the preferred pulsed output is an RZ short-pule format optical signal. The resulting pulse output, which traverses OC 503 to SOA 538 for optical amplification. The SOA amplifies the pulse stream, and the amplified pulse stream traverses OC 507 to OC 501 as depicted in FIG. 5 .

Figure 7:
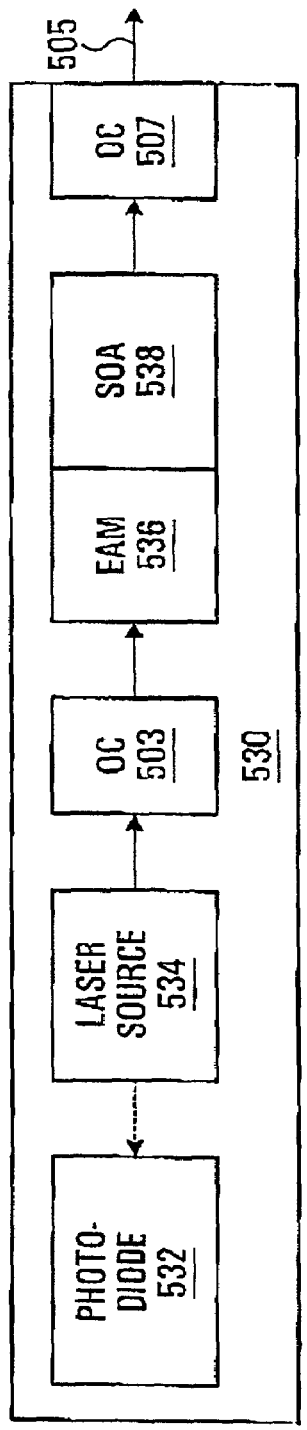
FIG. 7 depicts an optical pulse source (OPS) as shown in FIG. 5 constructed according to another embodiment of the invention.
Figure 8:
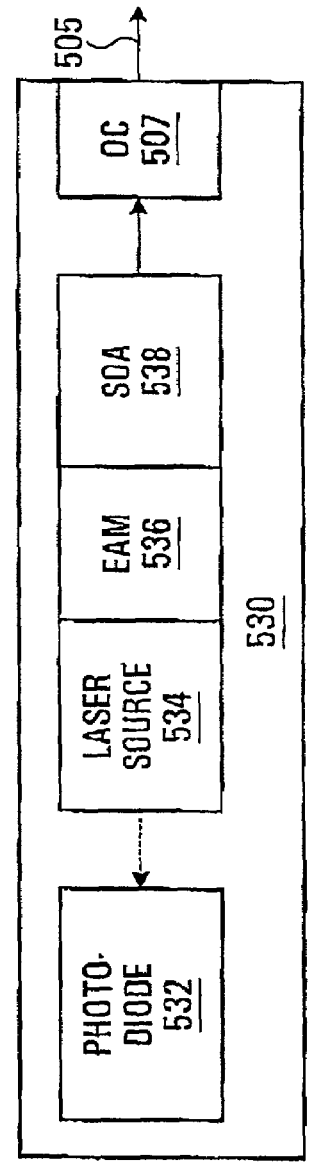
FIG. 8 depicts an optical pulse source (OPS) as shown in FIG. 5 constructed according to yet another embodiment of the invention.

The optical devices integrated on the OPS chip can be an arbitrary combination of devices shown in FIG. 6, and are illustrated in FIGS. 7 and 8. The components as shown in FIGS. 7 and 8 are the same components as those similarly numbered in FIG. 6, and function in the same manner. The only differences in the embodiment depicted in FIG. 7 from that depicted in FIG. 6 is that in FIG. 7 the EAM 536 and the SOA 538 are integrated on the same semiconductor chip, and the OC therebetween is not needed, and the laser source 534, and the EAM 536 are not integrated on the same semiconductor chip, and therefor an OC 503 is required therebetween. The only differences in the embodiment depicted in FIG. 8 from that depicted in FIG. 6 is that in FIG. 8 the laser source 530, the EAM 536 and the SOA 538 are all integrated on the same semiconductor chip, and the OC between the EAM 536 and the SOA 538 is not needed.

The integration of an OPS and a multiple-rate OTDM chip according to this embodiment of the invention mitigates at least some of the problems mentioned above with respect to size, complexity, cost. Problems associated with optical connections of present solutions, namely polarization matching, power loss and optical reflection are also mitigated. Specifically, to integrate the OPS and the multiple-rate OTDM con a single substrate or platform a single polarization maintaining waveguide can be employed. In this solution, the polarization states and waveguide properties are the same, hence reducing the problems of polarization matching, power loss and optical reflection.

While preferred embodiments of the invention have been described and illustrated, it will be apparent to one skilled in the art that numerous modifications, variations and adaptations may be made without departing from the scope of the invention as defined in the claims appended hereto.

We claim:

1. An integrated multiple-rate optical time division multiplexing (OTDM) module comprising:

at least one integrated controllable optical delay switching and combining array for introducing at least one prescribed optical delay between a first optical RZ signal stream and a reference optical RZ signal stream to facilitate time division multiplexing of the first and the reference optical RZ signal streams, wherein the at least one integrated controllable optical delay switching and combining array is adapted to controllably switch a path of the first optical RZ signal stream to one of a plurality of optical delay elements according to a data rate of the first optical RZ signal stream to introduce a selected one of a plurality of optical signal delays to the first optical RZ signal stream relative to the reference optical RZ signal stream, whereby the time division multiplexing of the optical RZ signal streams may be facilitated for a number of different data rates.

2. An integrated multiple-rate OTDM module according to claim 1 wherein the at least one integrated controllable optical delay switching and combining array comprises:

at least one optical switch; and
a plurality of optical delay elements.

3. An integrated multiple-rate OTDM module according to claim 2 wherein the at least one integrated controllable optical delay switching and combining array is arranged in a parallel configuration and further comprises:

an n:1 optical combiner,
wherein the at least one optical switch is a 1:n optical switch, and the plurality of optical delay elements comprise n optical delay elements.

4. An integrated multiple-rate OTDM module according to claim 2 wherein the at least one integrated controllable optical delay switching and combining array is arranged in a cascaded configuration and further comprises:

a 2:1 optical combiner,
wherein the at least; one optical switch comprise one 1:2 optical switch and n−1 2:2 optical switches, and wherein the plurality of optical delay elements comprise 2n optical delay elements.

5. An integrated multiple-rate OTDM module according to claim 2 wherein the at least one integrated controllable optical delay switching and combining array is arranged in a parallel configuration and further comprises:

a 2:1 optical combiner,
wherein the at least one optical switch is a 1:2 optical switch, and the plurality of optical delay elements comprise two optical delay elements coupled to two outputs of the 1:2 optical switch, said two optical delay elements coupled to two inputs of the 2:1 combiner.

6. An integrated multiple-rate OTDM module according to claim 1 wherein the at least one integrated controllable optical delay switching and combining array comprise m−1 integrated controllable optical delay switching and combining arrays, wherein the at least one prescribed optical delay comprise m−1 prescribed optical delays, and where each of the m−1 integrated controllable optical delay switching and combining arrays are operable to receive an optical RZ signal stream of m optical RZ signal streams.

7. An integrated multiple-rate OTDM module according to claim 6 wherein m is 2, and wherein the at least one integrated controllable optical delay switching and combining array is arranged in a parallel configuration and comprises:
- a 1:n optical switch;
- n optical delay elements; and
- an n:1 optical combiner, wherein the plurality of optical delays comprise a set of n optical delays.

8. An integrated multiple-rate OTDM module according to claim 6 wherein m is 2, and wherein the at least one integrated controllable optical delay switching and combining array is arranged in a cascaded configuration and comprises:
- a 1:2 optical switch;
- n−1 2:2 optical switches;
- 2n optical delay elements; and
- a 2:1 optical combiner.

9. An integrated multiple-rate OTDM module according to claim 6 wherein m is 2, and wherein the at least one integrated controllable optical delay switching and combining array comprises:
- a 1:2 optical switch;
- two optical delay elements; and
- a 2:1 optical combiner.

10. An integrated multiple-rate OTDM module according to claim 6 wherein the m−1 prescribed optical delays comprise the set of prescribed optical delays Tj/m where $j \in \{1, \ldots, m-1\}$ and T is a period of the plurality of optical RZ signal streams.

11. An integrated multiple-rate OTDM module according to claim 1 wherein at least one electrode is deposited over a portion of a waveguide having the first optical RZ signal stream travelling therein, wherein a voltage applied to the at least one electrode is used for fine tuning an optical time delay introduced to the first optical RZ signal stream traveling in the portion of a waveguide.

12. An integrated multiple-rate OTDM module according to claim 1 further comprising a waveguide power tap for each of the optical RZ data streams.

13. An integrated optical time division multiplexing (OTDM) subsystem comprising:
- an optical pulse source (OPS) chip;
- an integrated multiple-rate optical time division multiplexing (OTDM) chip comprising at least one integrated controllable optical delay switching and combining array for introducing at least one prescribed optical delay between a first optical RZ signal stream and a reference optical RZ signal stream to facilitate time division multiplexing of the first and the reference optical RZ signal streams, wherein the at least one integrated controllable optical delay switching and combining array is adapted to controllably switch a path of the first optical RZ signal stream to one of a plurality of optical delay elements according to a data rate of the first optical RZ signal stream to introduce a selected one of a plurality of optical signal delays to first optical RZ signal stream relative to the reference optical RZ signal stream, whereby the time division multiplexing of the optical RZ signal streams may be facilitated for a number of different data rates; and
- optical connections interconnecting the OPS chip and the multiple-rate OTDM chip, wherein the OPS chip and the multiple-rate OTDM chip are integrated in a single substrate using hybrid packaging technology.

14. An integrated optical time division multiplexing (OTDM) subsystem according to claim 13 wherein the OPS chip comprises;
- a photodiode;
- a laser source;
- an electro-absorption modulator (EAM); and
- a semiconductor optical amplifier (SOA), wherein the photodiode monitors the optical power of the laser source, and the laser source produces an optical signal for gating by the EAM producing an optical pulse signal, said optical pulse signal amplified by the SOA to produce an amplified optical pulse signal, said amplified optical pulse signal provided to the multiple-rate OTDM chip for use in multiplexing a plurality of data signals.

15. An integrated optical time division multiplexing (OTDM) subsystem according to claim 14, wherein the EAM and the laser source are integrated in the same semiconductor chip.

16. An integrated optical time division multiplexing (OTDM) subsystem according to claim 14, wherein the EAM and the SOA are integrated in the same semiconductor chip.

17. An integrated optical time division multiplexing (OTDM) subsystem according to claim 14, wherein the EAM, the SOA, and the laser source are integrated in the same semiconductor chip.

18. A multiple-rate optical time division multiplexing (OTDM) module comprising:
- at least one controllable optical delay switching and combining array for introducing at least one prescribed optical delay between a first optical RZ signal stream and a reference optical RZ signal stream to facilitate time division multiplexing of the plurality first and the reference optical RZ signal streams, wherein the at least one controllable optical delay switching and combining array is adapted to controllably switch a path of the first optical RZ signal stream to one of a plurality of optical delay elements according to a data rate of the first optical RZ signal stream to introduce a selected one of a plurality of optical signal delays to the first optical RZ signal stream relative to the reference optical RZ signal stream, whereby the time division multiplexing of the optical RZ signal streams may be facilitated for a number of different data rates.

* * * * *